US007078638B2

(12) United States Patent
Nakazawa et al.

(10) Patent No.: US 7,078,638 B2
(45) Date of Patent: Jul. 18, 2006

(54) INHIBITOR SWITCH

(75) Inventors: Takashi Nakazawa, Tokyo (JP); Takeshi Okuhara, Tokyo (JP)

(73) Assignee: Niles Co., Ltd., Tokyo (JP)

( * ) Notice: Subject to any disclaimer, the term of this patent is extended or adjusted under 35 U.S.C. 154(b) by 0 days.

(21) Appl. No.: 10/669,293

(22) Filed: Sep. 24, 2003

(65) Prior Publication Data

US 2004/0060806 A1 Apr. 1, 2004

(30) Foreign Application Priority Data

Sep. 27, 2002 (JP) ............................ 2002-282529

(51) Int. Cl.
*H01H 1/50* (2006.01)

(52) U.S. Cl. .................................... 200/252; 200/61.85

(58) Field of Classification Search ................ 200/252, 200/61.85–61.91, 61.94

See application file for complete search history.

(56) References Cited

U.S. PATENT DOCUMENTS 5,111,180 A * 5/1992 Suzuki ....................... 340/456
5,693,925 A * 12/1997 Yamada et al. .......... 200/61.88
5,949,041 A * 9/1999 Sakairi et al. ........... 200/61.88
5,969,313 A * 10/1999 Ikeshima et al. ........ 200/61.88
6,089,118 A * 7/2000 Ishii et al. ............... 74/473.18
6,154,107 A * 11/2000 Tomotoshi .................. 335/205
6,506,988 B1 * 1/2003 Sato et al. ............... 200/61.88
6,610,939 B1 * 8/2003 Watada ..................... 200/16 D
6,630,636 B1 * 10/2003 Nakamura ................ 200/16 R
6,693,249 B1 * 2/2004 Watada et al. ........... 200/61.91

* cited by examiner

*Primary Examiner*—Michael Friedhofer
*Assistant Examiner*—Lisa Klaus
(74) *Attorney, Agent, or Firm*—Jordan and Hamburg LLP

(57) ABSTRACT

An inhibitor switch is joined to a manual shaft inside a mission case which can be readily positioned. The inhibitor switch in which a movable base is interlocked and linked to a manual shaft of an automatic transmission inside a mission case of the automatic transmission detects the rotation position of the manual shaft by the rotational movement of movable contacts with respect to fixed contacts. A pole base side is positioned by mating with the mission case in the rotational direction of the manual shaft. An insertion portion having a spacing in the axial direction of the manual shaft is provided in the pole base side, and one end of a positioning bracket is secured to the mission case side and the other end thereof is provided with an insert portion for insertion into insertion portion. The pole base side is positioned in the axial direction of the manual shaft by inserting the insert portion into insertion portion.

2 Claims, 6 Drawing Sheets

INHIBITOR SWITCH

BACKGROUND OF THE INVENTION

1. Field of the Invention

The present invention relates to an inhibitor switch for detecting a shift position in an automatic transmission.

2. Description of the Related Art

A conventional inhibitor switch is shown in FIGS. 6 and 7. FIG. 6 illustrates schematically the relationship between the automatic transmission and the inhibitor switch. FIG. 7 is an expanded view of the main components illustrating the inhibitor switch mounted on an automatic transmission. An inhibitor switch 101 is joined to a manual shaft 105 of an automatic transmission 103 for detecting the rotation position of the manual shaft 105.

The inhibitor switch 101 is provided with fixed brackets 107*a,* 107*b,* those fixed brackets 107*a,* 107*b* being secured by tightening to the outer surface of a mission case 109 of the automatic transmission 103.

Further, a manual lever 111 is mounted on the manual shaft 105 and interlock linked to a shaft lever 115 via a wire device 113 or the like.

Therefore, if the manual shaft 105 is rotated into the prescribed position by the operation of the shift lever 115 via the wire device 113 and manual lever 111, the automatic transmission 103 can be shifted. The rotation of the manual shaft 105 is detected by the inhibitor switch 101, making it possible to detect the shift position of the automatic transmission 103 (see, for example, Japanese Patent Application Laid-open No. H4-123038, page 2, FIGS. 1 and 2).

Because the inhibitor switch 101 is fixed by tightening to the outer surface of the mission case 109 of the automatic transmission 103, there is a surplus of space. For this reason, the inhibitor switch 101 can be positioned in the axial direction and rotation direction of the manual shaft 105 with fixed brackets 107*a,* 107*b,* as described hereinabove.

However, when the inhibitor switch 101 is arranged inside the mission case 109, sometimes there is absolutely no surplus space around the inhibitor switch 101, and it cannot be secured by tightening with the fixed brackets 107*a,* 107*b.*

It is an object of the present invention to conduct readily the positioning of the inhibitor switch joined to the manual shaft inside the mission case.

SUMMARY OF THE INVENTION

A first aspect of the present invention provides an inhibitor switch, comprising: a pole base on the fixed side having fixed contacts and a movable base that supports movable contacts and can move rotationally so as to cause the movable contacts to slide under the prescribed contact pressure against the fixed contacts, the movable base being interlock linked to a manual shaft of an automatic transmission inside a mission case of the automatic transmission and the rotation position of the manual shaft being detected by the rotational movement of the movable contacts with respect to the fixed contacts, wherein the pole base side is positioned by mating with the mission case side in the rotation direction of the manual shaft, an insertion portion having a spacing in the axial direction of the manual shaft is provided at the pole base side, a positioning bracket is provided, this bracket comprising an insert portion for inserting into the insertion portion at one end thereof and having the other end thereof secured to the mission case side, and the pole base side is positioned in the axial direction of the manual shaft by inserting the insert portion into the insertion portion.

A second aspect of the present invention provides an inhibitor switch according to the first aspect, wherein a mating part is provided at the pole base side, a rotation locking member for engaging with the mating part and locking the pole base side in the rotation direction of the manual shaft with respect to the mission case side is provided at the mission case side, and the positioning bracket and the rotation locking member are joined integrally and secured by tightening to the mission case side.

In accordance with the first aspect of the present invention, there are provided a pole base on the fixed side having fixed contacts and a movable base that supports movable contacts and can move rotationally so as to cause the movable contacts to slide under the prescribed contact pressure against the fixed contacts, the movable base is interlock linked to a manual shaft of an automatic transmission inside a mission case of the automatic transmission, and the rotation position of the manual shaft can be detected by the rotational movement of the movable contacts with respect to the fixed contacts.

Moreover, the pole base side is positioned by mating with the mission case in the rotation direction of the manual shaft, an insertion portion having a spacing in the axial direction of the manual shaft is provided in the pole base side, a positioning bracket is provided, this bracket comprising an insert portion for insertion into the insertion portion at one end thereof and having the other end thereof secured to the mission case side, and the pole base side can be positioned in the axial direction of the manual shaft by inserting the insert portion into the insertion portion.

Therefore, using the above-mentioned positioning bracket makes it possible to displace the tightening position from the periphery of the inhibitor switch and to position readily the inhibitor switch in the axial direction of the manual shaft even when no space is available around the inhibitor switch for securing by tightening.

In accordance with the second aspect of the present invention, in addition to the effect of the first aspect, a mating part is provided at the pole base side, a rotation locking member for mating with the mating part and locking the pole base side in the rotation direction of the manual shaft with respect to the mission case side is provided at the mission case side, and the positioning bracket and the rotation locking member can be joined integrally and secured by tightening to the mission case side.

Therefore, the rotation locking member and positioning bracket can be handled integrally, the number of parts is decreased and the assembling and management of parts are facilitated.

DESCRIPTION OF THE PREFERRED EMBODIMENTS

Figure 1:
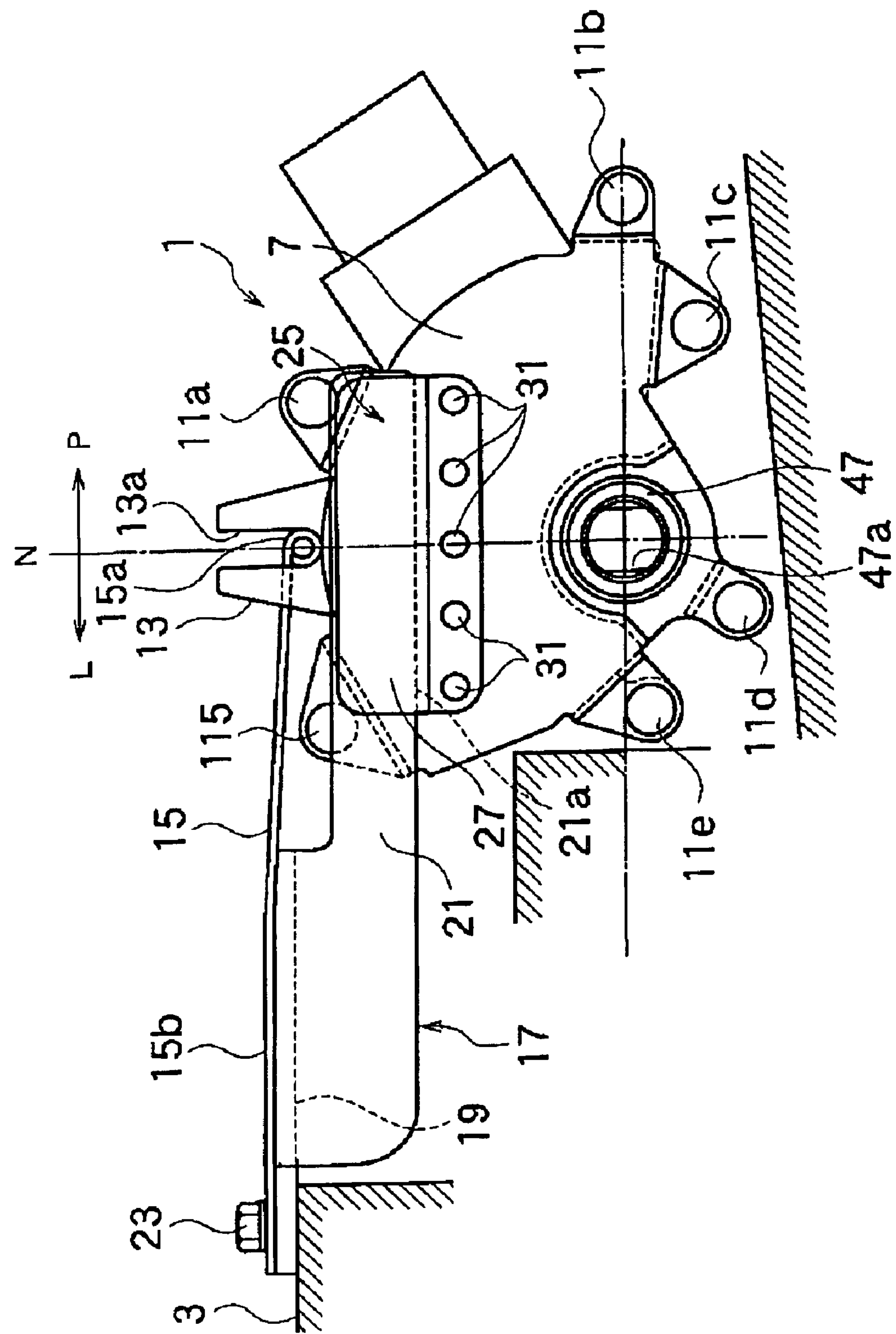
FIG. 1 is a front view illustrating the inhibitor switch of the embodiment of the present invention, which is mounted inside the mission case.
Figure 2:
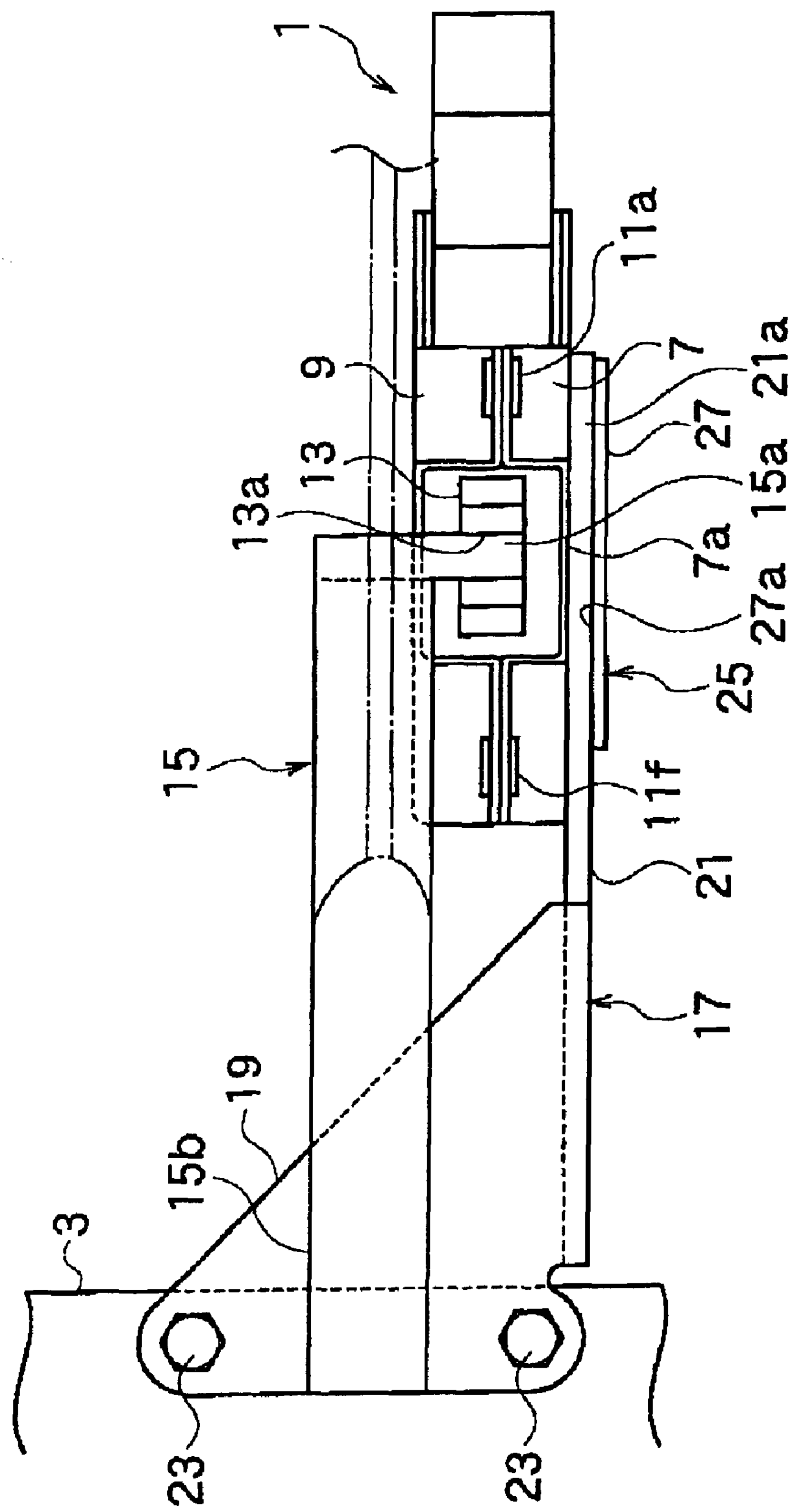
FIG. 2 is a plan view illustrating the inhibitor switch mounted inside the mission case, this view relating to the embodiment.
Figure 3:
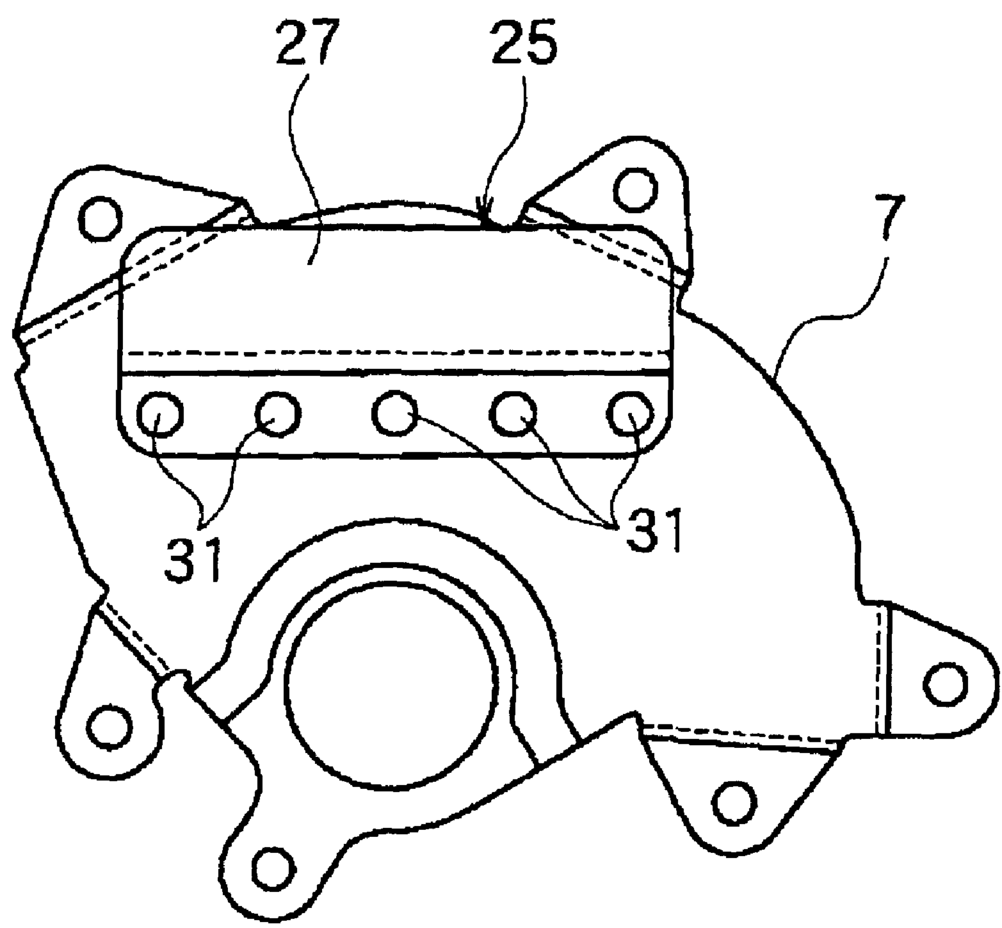
FIG. 3 is a front view of the cover, this view relating to the embodiment.
Figure 4:
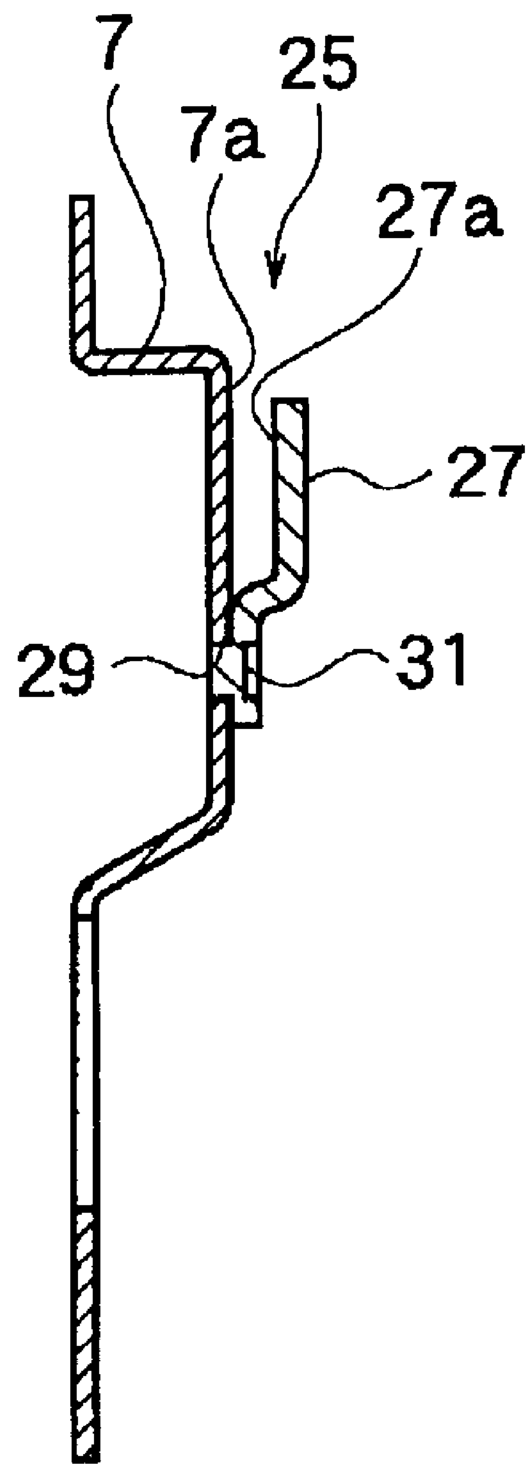
FIG. 4 is a cross-sectional view of the cover, this view relating to the embodiment.
Figure 5:
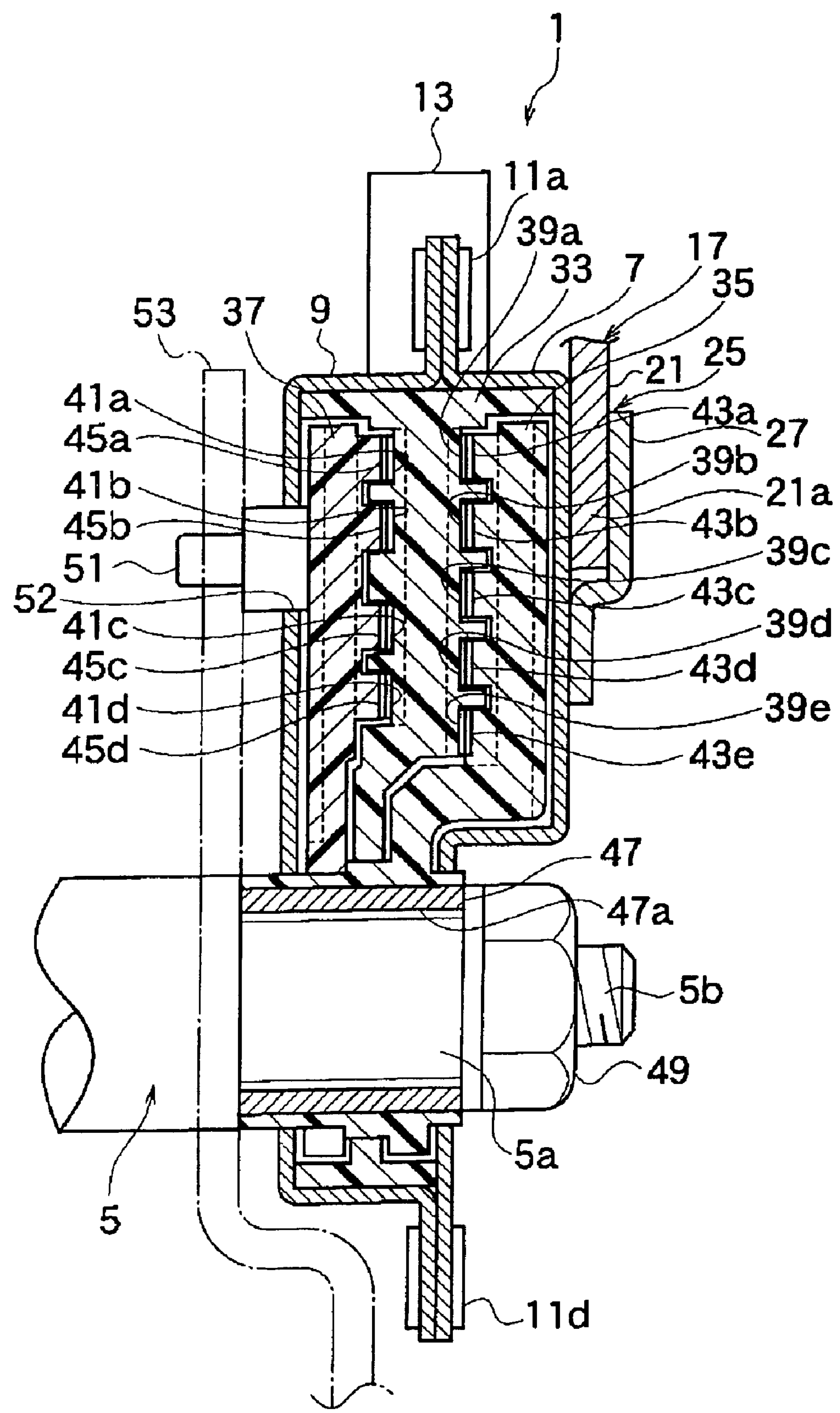
FIG. 5 is a cross-sectional view of the inhibitor switch mounted on the manual shaft; this view relating to the embodiment.
Figure 6:
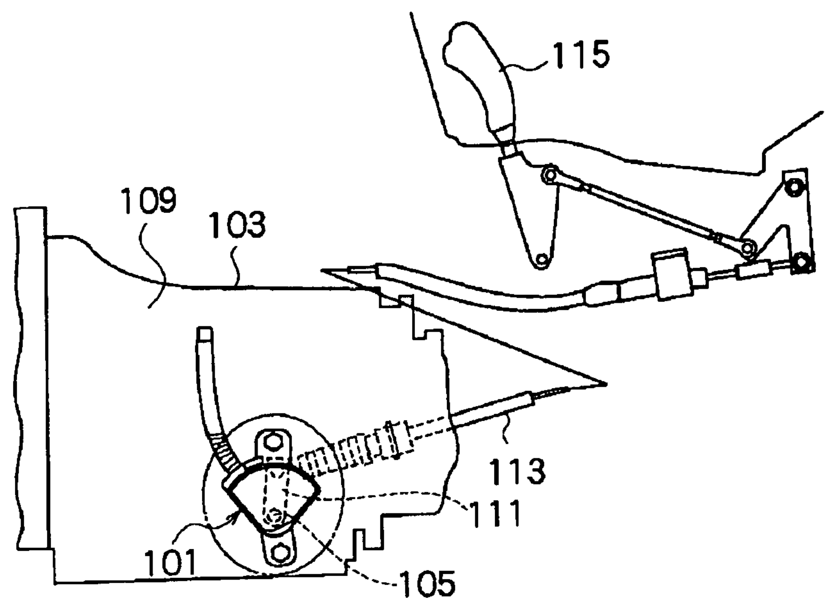
FIG. 6 illustrates schematically the relationship between the automatic transmission and the inhibitor switch, this figure relating to the conventional example.
Figure 7:
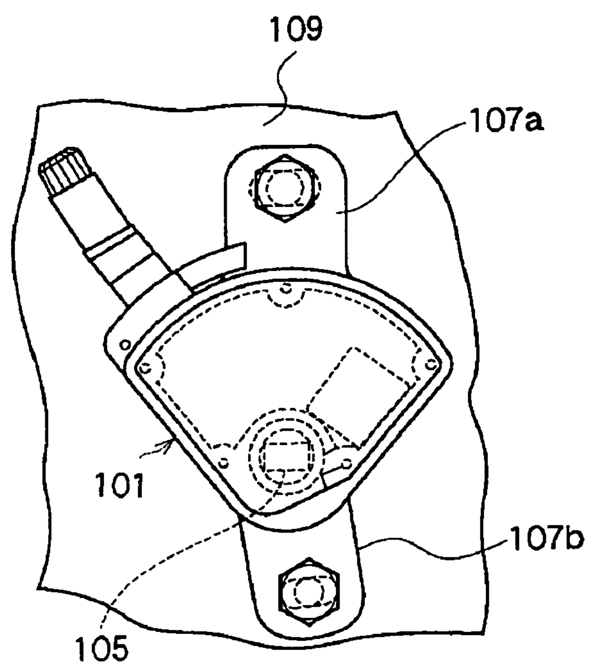
FIG. 7 is an expanded view illustrating the inhibitor switch secured by tightening to the automatic transmission.

FIGS. 1 through 5 relate to an embodiment of the present invention. FIG. 1 is a front view illustrating an inhibitor switch mounted inside a mission case of an automatic transmission. FIG. 2 is a plan view illustrating the aforesaid inhibitor switch. FIG. 3 is a front view of the inhibitor switch cover. FIG. 4 is a cross-sectional view thereof. FIG. 5 is a cross-sectional view of the inhibitor switch mounted on a manual shaft. In FIGS. 1 and 2, the manual shaft is omitted.

As shown in FIGS. 1 and 2, an inhibitor switch 1 is arranged inside a mission case 3 of an automatic transmission and interlock linked to the below-described manual shaft 5 (FIG. 5) of the automatic transmission.

An inhibitor switch 1 comprises the below-described pole base and movable base inside metallic covers 7, 9 that are joined together. Therefore, if the movable base moves rotationally due to the rotation of the manual shaft 5, and movable contact points move into the prescribed position with respect to fixed contact points, the rotation position of the manual shaft 5 can be detected. The covers 7 and 9 are integrally joined by caulking portions 11*a*, 11*b*, 11*c*, 11*d*, 11*e*, 11*f*.

A mating part 13 formed integrally with the pole base side is provided in a protruding condition in the upper part of the inhibitor switch 1. The mating part 13 is bifurcated and comprises a mating groove 13*a*. A rotation locking member 15 is engaged with mating groove 13*a*. Thus, the rotation locking member 15 is formed from a metal sheet material, and a rounded locking portion 15*a* is provided at the distal end of the rotation locking member 15. The locking portion 15*a* extends from the rotation locking member 15 toward the mating part 13 side and engages with the mating groove 13*a*. Base end portion 15*b* of the rotation locking member 15 is integrally joined to the below-described positioning bracket 17 and secured by tightening to the mission case 3 side.

Therefore, with the above-described configuration, the rotation locking member 15 locks the pole base on the fixed side of the inhibitor switch 1 in the rotation direction of the manual shaft 5 with respect to the mission case 3 side, thereby positioning the pole base side.

The above-mentioned positioning bracket 17 comprises a triangular (in a plan view) base portion 19 and an arm 21 formed by bending base portion 19 to one side. The base end portion 15*b* side of the rotation locking member 15 is secured to the base portion 19 by welding or the like. The base portion 19 is secured to the mission case 3 by tightening with a bolt 23. Therefore, with the above-described configuration, the rotation locking member 15 and the positioning bracket 17 are together secured to the mission case 3 by tightening.

One end of the position bracket 17, that is, a distal end portion 21*a* of the arm 21, is inserted into an insertion portion 25 provided in the cover 7. Therefore, the distal end portion 21*a* of the arm 21 serves as an insert portion which is to be inserted into the insertion portion 25. Thus, the inhibitor switch 1 can be positioned in the axial direction of the manual shaft 5 by inserting the distal end portion 21*a* of the arm 21 of the positioning bracket 17 into the insertion portion 25 and the securing base portion 19 located at the other end to the mission case 3.

The insertion portion 25 will be described below with reference to FIGS. 3 and 4. As shown in FIGS. 1 through 4, a support plate 27 is secured to the cover 7. Securing of the support plate 27 is conducted by caulking. Thus, a plurality of caulking holes 29 are provided in the cover 7, and a plurality of caulking portions 31 are provided in a protruding condition at the support plate 27 correspondingly to caulking holes 29. The caulking portions 31 are fit into the caulking holes 29, and the support plate 27 is joined to the cover 7 by caulking the caulking portions 31 to the caulking holes 29. In this state, an insertion portion 25 having a certain spacing in the axial direction of the manual shaft 5 is formed between the inner surface 27*a* of the support plate 27 and surface 7*a* of the cover 7.

The spacing between the inner surface 27*a* and the surface 7*a* corresponds to the thickness of the distal end portion 21*a* of the arm 21 of the positioning bracket 17. A gap allowing the distal end portion 21*a* to be inserted into the insertion portion 25 from behind and producing no adverse effect on positioning is formed between the distal end portion 21*a* and the spacing between the surface 7*a* and the inner surface 27*a*.

The distal end portion 21*a* of the arm 21 is inserted into the insertion portion 25, and the inhibitor switch 1 is positioned in the axial direction of the manual shaft 5, as described hereinabove.

The cross-sectional structure of the inhibitor switch 1 will be described below also with reference to FIG. 5.

Pole base 33 and movable bases 35, 37 are arranged inside the covers 7, 9. The pole base 33 is formed from an electrically insulating resin and comprises mating part 13 provided integrally therewith. The pole plane base 33 is provided with fixed contacts 39*a*, 39*b*, 39*c*, 39*d*, 39*e* on one side surface thereof and with fixed contacts 41*a*, 41*b*, 41*c*, 41*d* on the other side surface thereof.

Movable bases 35, 37 are formed from an electrically insulating resin and arranged so that they can be moved rotationally with respect to the pole base 33. Movable contacts 43*a*, 43*b*, 43*c*, 43*d*, 43*e* are provided on one movable base 35. Movable contacts 45*a*, 45*b*, 45*c*, 45*d* are provided on the other movable base 37. Therefore, the movable bases 35, 37 can be moved rotationally with respect to the pole base 33, the movable contacts 43*a*–43*e* can slide against the fixed contacts 39*a*–39*e* under the prescribed contact pressure, and the movable contacts 45*a*–45*d* can slide against the fixed contacts 41*a*–41*d* under the prescribed contact pressure. With such a configuration the rotation position of the manual shaft 5 is detected by the rotational movement of the movable contacts 43*a*–43*e* against the fixed contacts 39*a*–39*e* and by the rotational movement of the movable contacts 45*a*–45*d* against the fixed contacts 41*a*–41*d*.

A metal collar 47 is provided in the rotation center portion of one movable base 35. On the inner surface of the collar 47, a double-width part 47*a* is formed, fit onto a double-width part 5*a* formed in the manual shaft 5 and mated in the rotation direction.

The collar 47 side is secured by tightening to the manual shaft 5 with a nut 49 screwed on an externally threaded portion 5*b* of the manual shaft 5.

A rotary bearing pin 51 is provided in a protruding condition on the other movable base 37. The rotary bearing pin 51 protrudes from an elongated opening 52 in the cover 9 and mates with a detent plate 53. Elongated opening 52 is curved at a curvature with a rotation center of the manual shaft 5 as a center, allowing for the movement of the rotary bearing pin 51. The detent plate 53 is secured to the manual shaft 5 so as to rotate integrally therewith.

The inhibitor switch 1 of such a structure is joined to the manual shaft 5 with the portion of the collar 47 and secured by tightening the nut 49 prior to mounting the rotation locking member 15 and positioning bracket 17.

The rotation locking member 15 and positioning bracket 17 are then handled integrally, the locking portion 15*a* of the rotation locking member 15 is mated with the mating groove 13*a* of the mating part 13, and the distal end portion 21*a* of the arm 21 of the positioning bracket 17 is inserted into the insertion portion 25 between the inner surface 27*a* of the support plate 27 and side surface 7*a* of the cover 7. At the same time, the base portion 19 is secured by tightening to the mission case 3 with the bolt 23.

Mating the locking portion 15*a* with the mating groove 13*a* positions the entire inhibitor switch 1 in the rotation direction of the manual shaft via pole base 33.

Further, because such a positioning is carried out with the rotation locking member 15 and positioning bracket 17, the positioning of the inhibitor switch 1 can be readily conducted. Thus, because of the structure in which the rotation locking member 15 and the positioning bracket 17 are secured by tightening to the mission case 3 in the position remote from the periphery of the inhibitor switch 1 and extend from this part, positioning can be readily and reliably conducted in the rotation direction and axial direction of the manual shaft 5 even when there is absolutely no space for tightening and securing with the conventional bracket around the inhibitor switch 1.

Further, in the present embodiment, the rotation locking member 15 and positioning bracket 17 are joined integrally and tightened and fixed to the mission case 3 side. Therefore, the rotation locking member 15 and positioning bracket 17 can be handled integrally, the number of parts is decreased and the assembling and management of parts are facilitated.

With the above-described inhibitor switch 1, if the detent plate 53 is rotated via a connecting member by the operation of a shift lever, then the manual shaft 5 rotates in response to this rotation and the shift position is switched. At this time, the movable base 35 rotates integrally with the manual shaft 5 via the collar 47, and the movable base 37 similarly rotates via the rotary bearing pin 51 engaged with the detent plate 53. As a result of this rotation, the movable bases 35, 37 move rotationally, as described above, the movable contacts 43*a*–43*e* move rotationally with respect to the fixed contacts 39*a*–39*e*, and the movable contacts 45*a*–45*e* move rotationally with respect to the fixed contacts 41*a*–41*d*, thereby making it possible to detect, for example, the rotation position of the manual shaft 5 and to conduct accurate detection of shift position or the like.

Further, in the above-described embodiment, the rotation locking member 15 was integrally secured to the positioning bracket 17. However, the two components can be also provided separately and each of them can be independently secured by tightening to the mission case 3.

Moreover, if the lower edge of the distal end portion 21*a* of the arm 21 of the positioning bracket 17 is pressed against the step-shaped bottom of the support plate 27, then positioning in the rotation direction of the manual shaft 5 can be also conducted by the distal end portion 21*a* and support plate 27. In this case, the rotation locking member 15 which is provided separately can be omitted. Conversely, it is also possible to position inhibitor switch 1 in the rotation direction and axial direction of the manual shaft 5 with only the locking portion 15*a* by omitting the positioning bracket 17, forming a surface capable of mating in the axial direction of the manual shaft 5 in the locking part 15*a* of the rotation locking member 15, and forming a locking surface on the mating part 13 according to this surface. In this case, the rotation locking member 15 also functions as the positioning bracket.

| | |
|---|---|
| 1 | INHIBITOR SWITCH |
| 3 | MISSION CASE |
| 5 | MANUAL SHAFT |
| 13 | MATING PART |
| 15 | ROTATION LOCKING MEMBER |
| 17 | POSITIONING BRACKET |
| 25 | INSERTION PORTION |
| 33 | POLE PLATE |
| 35, 37 | MOVABLE BASES |
| 39a–39e, 41a–41d | FIXED CONTACTS |
| 43a–43e, 45a–45d | MOVABLE CONTACTS |

What is claimed is:

1. An inhibitor switch used with an automatic transmission having a mission case and a manual rotatable manual shaft, comprising:

a pole base having fixed contacts;

a movable base that supports movable contacts that move rotationally so as to cause said movable contacts to slide under contact pressure against said fixed contacts;

said movable base being interlocked and linked to the manual shaft of the automatic transmission inside the mission case of the automatic transmission and a rotation position of the manual shaft being detected by a rotational movement of the movable contacts with respect to said fixed contacts;

said pole base mating with said mission case;

an insertion portion having a spacing in the axial direction of said manual shaft provided on said pole base;

a positioning bracket comprising an insert portion for inserting into said insertion portion at one end thereof and having another other end thereof secured to said mission case side; and said pole base side is positioned axially of said manual shaft by inserting said insert portion into said insertion portion.

2. An inhibitor switch according to claim 1, wherein a mating part is provided at said pole base;

a rotation locking member for engaging with said mating part and locking said pole base in a rotation direction of said manual shaft with respect to said mission case; and said positioning bracket and said rotation locking member being joined integrally and secured to said mission case.

* * * * *